United States Patent
Nagano et al.

(10) Patent No.: US 8,046,038 B2
(45) Date of Patent: Oct. 25, 2011

(54) PORTABLE WIRELESS APPARATUS

(75) Inventors: Kenya Nagano, Ishikawa (JP); Tadashi Ooga, Kanagawa (JP); Yasunari Tanaka, Kanagawa (JP); Yutaka Saitou, Ishikawa (JP); Tomoaki Nishikido, Ishikawa (JP)

(73) Assignee: Panasonic Corporation, Osaka (JP)

(*) Notice: Subject to any disclaimer, the term of this patent is extended or adjusted under 35 U.S.C. 154(b) by 719 days.

(21) Appl. No.: 10/598,243

(22) PCT Filed: Feb. 23, 2004

(86) PCT No.: PCT/JP2004/002051
§ 371 (c)(1),
(2), (4) Date: Aug. 22, 2006

(87) PCT Pub. No.: WO2005/081417
PCT Pub. Date: Sep. 1, 2005

(65) Prior Publication Data
US 2008/0167093 A1    Jul. 10, 2008

(51) Int. Cl.
*H04M 1/00* (2006.01)

(52) U.S. Cl. .......... 455/575.7; 455/101; 455/13.3; 455/562.1; 455/575.3; 455/557; 455/556.1

(58) Field of Classification Search .......... 455/574.1, 455/574.3, 90.3, 128, 347, 101, 13.3, 562.1, 455/575.7, 575.3, 557, 556.1; 343/702, 703
See application file for complete search history.

(56) References Cited

U.S. PATENT DOCUMENTS

| | | | |
|---|---|---|---|
| 6,628,236 B2 * | 9/2003 | Kim et al. | 343/702 |
| 6,781,544 B2 * | 8/2004 | Saliga et al. | 343/700 MS |
| 6,897,825 B2 * | 5/2005 | Kim et al. | 343/803 |
| 7,061,520 B2 * | 6/2006 | Choi | 348/14.02 |
| 2001/0004269 A1 | 6/2001 | Shibata | |
| 2002/0130019 A1 * | 9/2002 | Ninomiya et al. | 200/61.7 |
| 2003/0064758 A1 * | 4/2003 | Mizuta et al. | 455/566 |

FOREIGN PATENT DOCUMENTS

| | | |
|---|---|---|
| EP | 1 324 425 A1 | 7/2003 |
| GB | 2 387 078 A | 10/2003 |

(Continued)

OTHER PUBLICATIONS

European Search Report.

(Continued)

*Primary Examiner* — Nick Corsaro
*Assistant Examiner* — Vladimir Magloire
(74) *Attorney, Agent, or Firm* — Seed IP Law Group PLLC

(57) ABSTRACT

It is an object of the invention to provide a portable wireless apparatus capable of maintaining high quality of a communication in various using configurations obtained by a two-axis hinge mechanism.
A portable wireless apparatus (100) having a two-axis hinge portion includes a first antenna (102) which is suitable for a talking state and a second antenna (104) which is suitable for a waiting state. The first antenna (102) or the second antenna (104) is selected based on a result of opening/closing detection decided from an angle α of a first axis (106) and the result of opening/closing detection decided from an angle β of a second axis (107). Consequently, it is possible to select either of the antennas which is not influenced by hands or fingers of a user.

7 Claims, 10 Drawing Sheets

| FIRST DETECTING PORTION, RESULT OF DETECTION | SECOND DETECTING PORTION, RESULT OF DETECTION | ANTENNA SELECTION |
|---|---|---|
| OPEN | CLOSE | FIRST |
| CLOSE | CLOSE | SECOND |
| OPEN | OPEN | SECOND |

FOREIGN PATENT DOCUMENTS

| | | |
|---|---|---|
| JP | 11-177485 | 7/1999 |
| JP | 11-247840 | 9/1999 |
| JP | 2001-103002 | 4/2001 |
| JP | 2001-169166 | 6/2001 |
| JP | 2001-358514 A | 12/2001 |
| JP | 2001-358802 A | 12/2001 |
| JP | 2002-190752 A | 7/2002 |
| JP | 2002-217803 A | 8/2002 |
| JP | 2002-368850 | 12/2002 |
| JP | 2003-133991 | 5/2003 |
| JP | 2003-174495 | 6/2003 |
| JP | 2003-309634 | 10/2003 |

OTHER PUBLICATIONS

Japanese Office Action.

* cited by examiner

|  | FIRST DETECTING PORTION | SECOND DETECTING PORTION |
|---|---|---|
| OPEN | α=10°~160° | β=10°~90° |
| CLOSE | α=0°~10° | β=0°~10° |

| FIRST DETECTING PORTION, RESULT OF DETECTION | SECOND DETECTING PORTION, RESULT OF DETECTION | ANTENNA SELECTION |
|---|---|---|
| OPEN | CLOSE | FIRST |
| CLOSE | CLOSE | SECOND |
| OPEN | OPEN | SECOND |

PORTABLE WIRELESS APPARATUS

TECHNICAL FILED

The present invention relates to a portable wireless apparatus to be utilized in mobile telecommunications.

BACKGROUND ART

Conventionally, there has been known an antenna device to be used for a portable wireless apparatus, for example, a cell phone as shown in FIG. 11. FIG. 11 is a view showing an appearance of a portable wireless apparatus mounting a conventional antenna device thereon. A cell phone 400 uses a TDMA (Time Division Multiple Access) method having a diversity function. More specifically, the cell phone 400 has two antennas 401 and 402 and compares received electric field intensities of the antennas 401 and 402 by utilizing a spare time for a communication, thereby selecting either of the antennas which has a higher received electric field intensity.

The antenna 401 is a whip and helical antenna of an extension type, and is operated as a whip antenna when it is extended from a housing and is operated as a helical antenna when it is accommodated in the housing. The antenna 402 is a built-in antenna such as a reverse F antenna.

FIG. 12 is a view showing an appearance of a portable wireless apparatus using a CDMA (Code Division Multiple Access) method. For a radio communication using the CDMA method, a communicating operation is continuously carried out differently from a radio communication using the TDMA method, that is, a spare time is not generated in the radio communication. For this reason, it is hard to implement the diversity function utilizing the spare time In a conventional portable wireless apparatus 500 using the CDMA method, only one antenna is provided. While the only one antenna 501 is a whip and helical antenna of an extension type in FIG. 12, it may be a built-in antenna such as the reverse F antenna.

In the portable wireless apparatus mounting one antenna thereon, however, there is a problem in that the performance of the antenna is considerably deteriorated and quality of the communication is reduced in the case in which the antenna is pressed with a hand or fingers. According to a measurement carried out by the inventors, a receiving sensitivity is deteriorated by approximately 5 dB when a finger is put on the antenna portion, and is deteriorated by approximately 15 dB when the antenna portion is held in a hand as compared with a state in which the finger or the hand does not touch the antenna portion.

In recent years, particularly, an antenna of such a type as to be provided in a housing of a portable wireless apparatus has spread to enhance a designing property and to improve a convenience in a pocket accommodation. In such a built-in antenna, an antenna portion is covered with a hand or fingers more easily than an antenna protruded to an outside so that the problem is much more remarkable.

FIG. 13 is a view showing an appearance of a portable wireless apparatus using a CDMA method having a built-in antenna, A portable wireless apparatus 600 using the CDMA method is a folding type portable wireless apparatus for solving the problem, and has an upper housing 601 and a lower housing 602 which are supported rotatably around a hinge portion 605. A first antenna 603 is provided in the upper housing 601. Moreover, a second antenna 604 is provided in the lower housing 602. In addition, the portable wireless apparatus 600 is provided with opening/closing detecting portions 606 (600a and 600b) for detecting the opening and closing states of the upper housing 601 and the lower housing 602.

FIG. 14 is a diagram showing a structure of an antenna device mounted on the folding type portable wireless apparatus 600. The antenna device is comprising the first antenna 603, the second antenna 604, a change-over switch 608, an RF portion (wireless circuit) 609, a control portion 607 and the opening/closing detecting portion 606.

In many cases, generally, a communication is being carried out in a state in which the portable wireless apparatus 600 is opened. A user holds the lower housing 602 or the hinge portion 605 in a hand, thereby carrying out a communication. For this reason, the hands or fingers of the user touch a tip portion T of the upper housing 601 with difficulty. In the case in which a result of detection carried out by the opening/closing detecting portion 606 is an opening state, therefore, the control portion 607 transmits, to the change-over switch 608, a control signal for connecting the first antenna 603 to the RF portion 609, thereby connecting the first antenna 603 to the RF portion 609.

The first antenna 603 is a one-wavelength dipole antenna in which high quality of a communication can be obtained in a talking state. Moreover, the opening/closing detecting portion 606 is constituted by the permanent magnet 606a provided in the upper housing 601 and the magnetic force detector (for example, a Hall element) 606b provided in the lower housing 602. When the upper housing 601 and the lower housing 602 are closed, the permanent magnet 606a and the magnetic force detector 606b are close to each other so that a magnetic force detected by the magnetic force detector 606b is increased. On the other hand, when the upper housing 601 and the lower housing 602 are opened, the permanent magnet 606a and the magnetic force detector 606b separate from each other. For this reason, the magnetic force detected by the magnetic force detector 606b is reduced. By utilizing this fact, the detection of the opening/closing operations of the upper housing 601 and the lower housing 602 is carried out. The opening/closing detecting portion may have a structure in which the magnetic force detector is provided in the upper housing 601 and the permanent magnet is provided in the lower housing.

In a state in which the portable wireless apparatus 600 is closed, a waiting condition is set in many cases. In the case in which the user holds the portable wireless apparatus 600 in a hand, a position which is hard to touch with the hands or fingers is placed in the vicinity of the hinge portion 605. For this reason, in the case in which a result of the detection carried out by the opening/closing detecting portion 606 is a closing state, the control portion 607 transmits, to the change-over switch 608, a control signal for connecting the second antenna 604 to the RF portion 609, thereby connecting the second antenna 604 to the RF portion 609. Since the second antenna 604 is of an unbalanced power feeding type for radiating an electric wave from a ground pattern on a printed board in which the RF portion 609 is disposed, it has a high radiation efficiency and is suitable for waiting. By detecting the opening and closing states of the portable wireless apparatus 600 and selecting a suitable antenna for the respective states depending on the result of the detection, thus, it is possible to enhance the quality of the communication.

In recent years, moreover, a portable wireless apparatus mounting an image pick-up device (a camera) thereon has spread. There has been known a portable wireless apparatus which mounts a plurality of antennas thereon, detects visual information in the vicinity of the portable wireless apparatus by means of the camera and decides an electric wave propagation environment from the visual information, thereby selecting an antenna (for example, see Patent Document 1). In more detail, the portable wireless apparatus calculates an angle thereof with respect to a perpendicular line from a ground based on an image picked up by the camera and selects the most suitable antenna for a plane of polarization of an electric wave to arrive based on information about the angle, thereby implementing an excellent antenna characteristic.

With the spread of the portable wireless apparatus mounting the photographing device thereon, moreover, a user has demanded the appearance of a portable wireless apparatus having a two-axis hinge mechanism which has conventionally been mounted on a video camera (for example, see Patent Document 2).

FIG. 15 is a view showing an appearance of the portable wireless apparatus mounting the two-axis hinge mechanism thereon. A portable wireless apparatus 700 has such a structure that an upper housing 702 and a lower housing 703 are connected to each other through a two-axis hinge portion 701. Moreover, an image pick-up device (camera) 704 is provided in the lower housing 703. The portable wireless apparatus 700 can be used with the housing opened as in the folding type portable wireless apparatus 600 in the case in which a telephone function is used, and can fix a screen into such a position as to be easily seen (a photographing state) to carry out photographing when the image pick-up device is used. Thus, it is possible to enhance the convenience of the user.

Furthermore, a portable wireless apparatus mounting a plurality of image pick-up devices thereon has been started to appear. By mounting the image pick-up devices, it is possible to properly use the image pick-up devices in the case in which a user himself (herself) is to be photographed and the case in which an object is to be photographed.

(Patent Document 1) JP-A-2001-103002 Publication
(Patent Document 2) JP-A-11-247840 Publication However, the conventional portable wireless apparatus has the following problems and an improvement thereof has been demanded. More specifically, the potable wireless apparatus having a two-axis hinge mechanism has various using configurations which cannot be obtained by the folding type portable wireless apparatus but the two-axis hinge mechanism. In such using configurations, particularly, it is hard to always maintain high quality of a communication in the portable wireless apparatus using the CDMA method.

In the portable wireless apparatus mounting the image pick-up device thereon, when visual information in the vicinity thereof is detected to carry out a switching control for an antenna, it is hard to maintain the high quality of the communication if the hands or fingers of the user approach the antenna.

The invention has been made to solve the problems and has an object to provide a portable wireless apparatus capable of maintaining high quality of a communication in various using configurations obtained by a two-axis hinge mechanism.

DISCLOSURE OF THE INVENTION

A portable wireless apparatus according to the invention has a hinge portion for opening/closing and rotatably supporting a first housing with respect to a second housing and serves to feed a power between an antenna provided in the first housing or the second housing and a built-in wireless circuit, and comprises opening/closing detecting means for detecting an opening/closing state of the first housing with an opening/closing axis of the hinge portion set to be a center, rotation detecting means for detecting a rotation state of the first housing with a rotating axis of the hinge portion set to be a center, and selecting means for selecting any of a plurality of antennas provided in at least one of the first housing and the second housing which is to be operated based on the opening/closing state and the rotation state.

By this structure, it is possible to select an antenna which is not influenced by hands or fingers of a user depending on a using configuration based on the results of detection carried out by the opening/closing detecting means and the rotation detecting means. In various using configurations obtained by the two-axis hinge mechanism, consequently, it is possible to maintain high quality of a communication.

Moreover, the antennas are comprising a first antenna and a second antenna, the first antenna is provided on an end of the first housing at an opposite side of the hinge portion and the second antenna is provided on an end of the second housing at the hinge portion side.

By this structure, it is possible to select a proper one of the antennas which is not influenced by the hands or fingers of the user in different using configurations respectively, for example, a waiting state in which the two housings are folded and a talking state in which the two housings are opened. In various using configurations obtained by the two-axis hinge mechanism, it is possible to maintain high quality of a communication.

Furthermore, the selecting means selects the first antenna when the opening state is detected and a non-rotation state is detected, selects the second antenna when the closing state is detected and the non-rotation state is detected, and selects the second antenna when the opening state is detected and a rotation state is detected.

By this structure, the first antenna is selected in the case in which the two housings are set in the opening state and the non-rotation state is set, and the second antenna is selected in the case in which the two housings are set in the closing state and the non-rotation state is set. Consequently, it is possible to select the first antenna which is not influenced by the hands or fingers of the user in the talking state in which the two housings are opened and the second antenna which is not influenced by the hands or fingers of the user in the waiting state in which the two housings are folded in suitable using configurations, respectively. In various using configurations obtained by the two-axis hinge mechanism, accordingly, it is possible to maintain the high quality of the communication.

Moreover, there are provided a plurality of image pick-up means and comparing means for comparing luminances of images photographed by the image pick-up means respectively, the selecting means selecting any of the antennas which is to be operated based on the detected opening/closing state, the detected rotation state and a result of the comparison.

By this structure, in the case in which the image pick-up means is mounted, it is possible to select any of the antennas which is not influenced by the hands or fingers of the user depending on the using configuration from the results of the detection carried out by the opening/closing detecting means and the rotation detecting means and the result of the comparison of the luminances of images picked up by the image pick-up means. In the various using configurations obtained by the two-axis hinge mechanism, thus, it is possible to maintain the high quality of the communication.

Furthermore, the image pick-up means are comprising first image pick-up means and second image pick-up means, and the first image pick-up means is disposed in the vicinity of the first antenna and the second image pick-up means is disposed in the vicinity of the second antenna.

By this structure, it is possible to select a proper one of the antennas which is not influenced by the hands or fingers of the user in different using configurations respectively, for example, a waiting state in which the two housings are folded, a talking state in which the two housings are opened and a photographing state in which the two housings are opened and rotated. In various using configurations obtained by the two-axis hinge mechanism, thus, it is possible to maintain high quality of a communication.

Moreover, the selecting means selects the first antenna when a luminance of the first image pick-up means is higher than that of the second image pick-up means, and selects the second antenna when the luminance of the first image pick-up means is lower than that of the second image pick-up means.

By this structure, in the case in which the luminance of the pick-up image is low, it is decided that the hands or fingers of the user are present in the vicinity of the image pick-up means so that a proper one of the antennas which is not influenced by the hands or fingers of the user can be selected. In the various using configurations obtained by the two-axis hinge mechanism, it is possible to maintain high quality of a communication.

Furthermore, in the case in which the opening state is detected and a rotation state is detected, the selecting means selects the first antenna when the luminance of the first image pick-up means is higher than that of the second image pick-up means, and selects the second antenna when the luminance of the first image pick-up means is lower than that of the second image pick-up means.

By this structure, in the case in which the two housings are set in the opening state and the rotation state is set, the first antenna is selected if the luminance of the first image pick-up means is higher than that of the second image pick-up means, and the second antenna is selected if the luminance of the first image pick-up means is lower than that of the second image pick-up means. Consequently, it is possible to select any of the antennas which is not influenced by the hands or fingers of the user in the photographing state in which the two housings are opened and rotated. In the various using configurations obtained by the two-axis hinge mechanism, accordingly, it is possible to maintain high quality of a communication.

Moreover, a portable wireless apparatus according to the invention serves to feed a power between antennas provided in housings and a wireless circuit provided in the housing, and comprises a plurality of image pick-up means, comparing means for comparing luminances of images photographed by the image pick-up means respectively, and selecting means for selecting any of the antennas provided in the housings which is to be operated based on a result of the comparison.

By this structure, in the portable wireless apparatus mounting the image pick-up means thereon, it is possible to decide the influence of the hands or fingers of the user depending on the luminance of the pick-up image, thereby selecting a proper one of the antennas. Thus, it is possible to reduce the influence of the hands or fingers of the user on the antenna, thereby maintaining the high quality of the communication.

Figure 1:
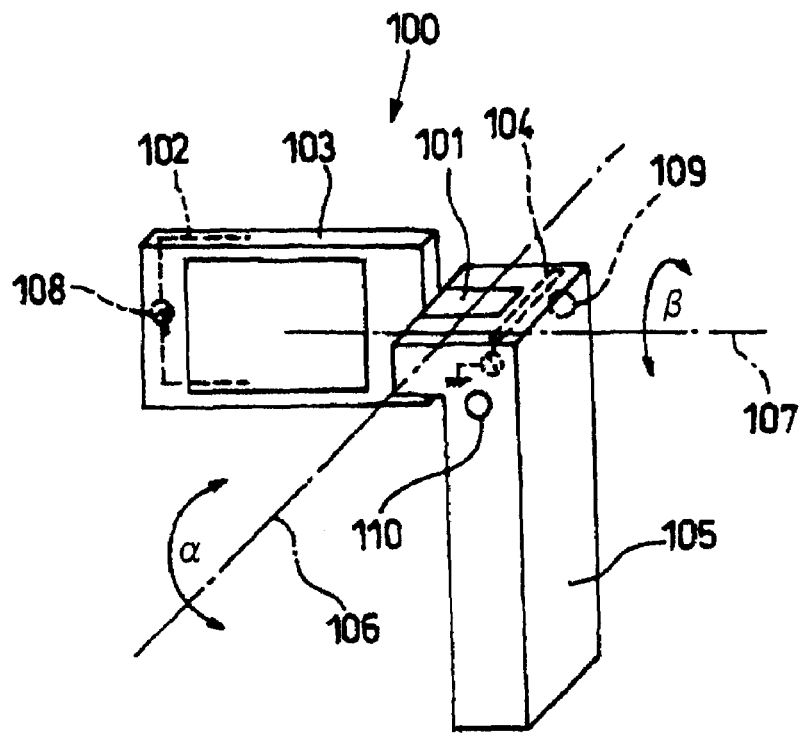
FIG. 1 is an explanatory view showing a structure of an appearance of a portable wireless apparatus according to a first embodiment of the invention.

In the drawings, 100 and 200 denote a portable wireless apparatus, 101 denotes a two-axis hinge portion, 102 denotes a first antenna, 103 denotes an upper housing, 104 denotes a second antenna, 105 denotes a lower housing, 114 denotes a first detecting portion, 115 denotes a second detecting portion, 116 denotes a control portion, 117 denotes a switching portion, 201 denotes a first image pick-up portion, 202 denotes a second image pick-up portion, 203 denotes a first luminance detecting portion, 204 denotes a second luminance detecting portion, and 205 denotes a comparing portion.

BEST MODE FOR CARRYING OUT THE INVENTION

Embodiments of the invention will be described below with reference to the drawings.

In the embodiments, the description will be given to an example of a structure in which the invention is applied to a portable wireless apparatus using a CDMA method.

First Embodiment

FIG. 1 is a view showing an appearance of a portable wireless apparatus according to a first embodiment. A portable wireless apparatus 100 has a two-axis hinge portion 101 for opening/closing and rotatably supporting an upper housing 103 with respect to a lower housing 105. A first antenna 102 is provided in a tip portion of the upper housing 103 (an end on the opposite side of the hinge portion 101). A second antenna 104 is provided in a tip portion of the lower housing 105 (an end on the hinge portion 101 side).

Figure 2:
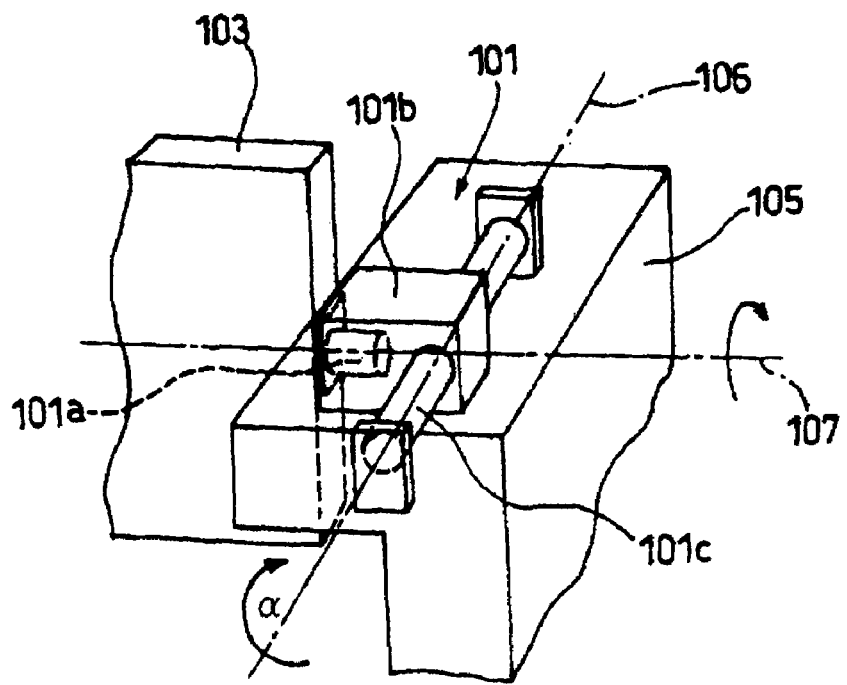
FIG. 2 is a perspective view showing a schematic structure of a two-axis hinge portion in the portable wireless apparatus according to the embodiment.

FIG. 2 is a view showing a schematic structure of the two-axis hinge portion 101. The two-axis hinge portion 101 includes a rotating member 101a, a support member 101b and a fixing member 101c as main members. Both ends of the fixing member 101c are fixed to the lower housing 105. A hole is formed on the support member 101b in an axial direction of an opening/closing axis 106, and the fixing member 101c is fitted in the hole. The support member 101b is rotatable around the fixing member 101c with the opening/closing axis 106 set to be a center and is held at an optional angle. The rotating member 101a has one of ends which is fixed to an end face of the upper housing 103 and the other end which is fitted in a hole formed on an end face of the support member 101b, and is rotatable around the support member 101b with a rotating axis 107 set to be a center and is held at an optional angle.

In the two-axis hinge portion 101 having such a structure, the support member 101b is rotated around the first axis (opening/closing axis) 106 to open/close the upper housing 103 with respect to the lower housing 105, and the rotating member 101a is rotatable around the second axis (rotating axis) 107 in a state in which the upper housing 103 is opened. A movable range of the support member 101b has α=0 to 160 degrees with the first axis 106 set to be the center, and a movable range of the rotating member 101a has β=0 to 90 degrees with the second axis 107 set to be the center. FIG. 1 shows a state of α=90 degrees and β=90 degrees. In case of α=0 degree and β=0 degree, the portable wireless apparatus is brought into a folding state.

The first antenna 102 is a dipole antenna which is provided in the vicinity of a speaker 108 in the tip portion of the upper housing 103, and can obtain a high antenna gain in a state of α=160 degrees and β=0 degree, that is, a state in which the portable wireless apparatus is opened to carry out talking (a talking state). On the other hand, the second antenna 104 is a monopole antenna which is provided in the vicinity of the two-axis hinge portion 101 as described above, and can obtain a high antenna gain in a state of α=0 degree and β=0 degree, that is, a state in which the portable wireless apparatus is closed (a waiting state).

Moreover, the portable wireless apparatus 100 has an image pick-up portion 109 capable of photographing both a dynamic image and a static image, and a switch 110 for giving an instruction for starting the photographing. The image pick-up portion 109 is disposed on a side surface of the lower housing 105 in the vicinity of the two-axis hinge portion 101. The switch 110 is disposed on the side surface of the lower housing 105 on the opposite side of the image pick-up portion 109.

Figure 3:
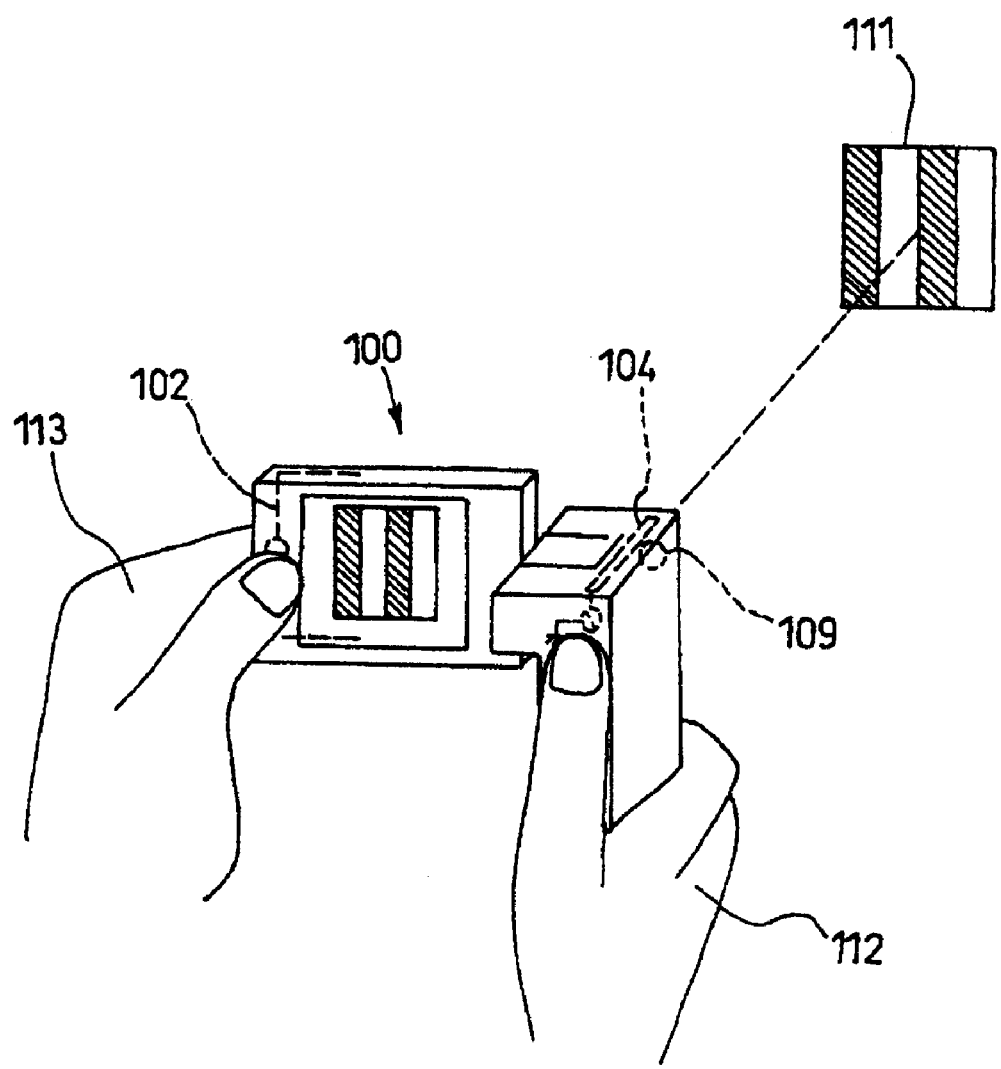
FIG. 3 is an explanatory view showing a state in which a user holds the portable wireless apparatus according to the first embodiment in a hand to photograph an object.

FIG. 3 is a view showing a state in which a user holds the portable wireless apparatus 100 in hands to photograph an object 111. In a photographing state, a thumb of a right hand 112 of the user presses the switch 110 and a left hand 113 of the user holds the upper housing 103.

Figures 4, 5, 6:
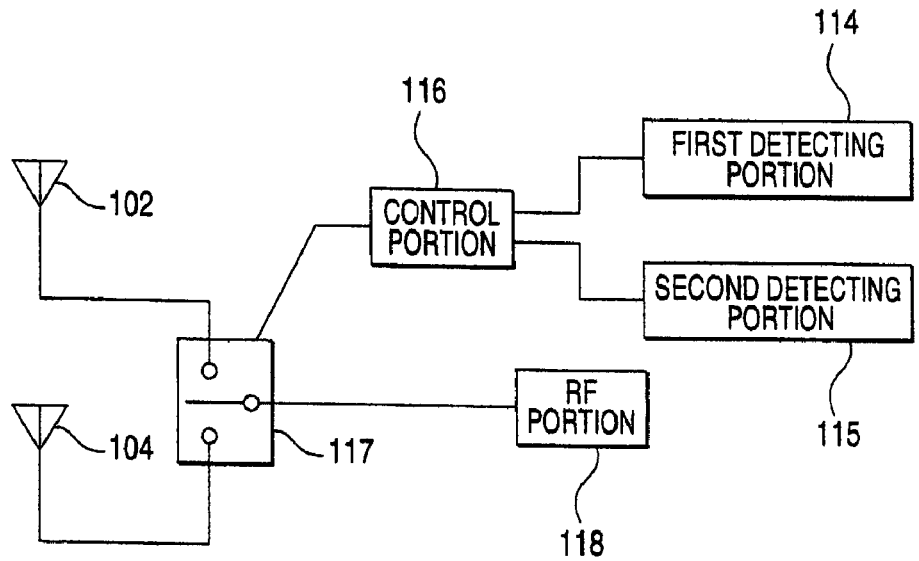
FIG. 4 is a block diagram showing an electrical connecting structure of an antenna device mounted on the portable wireless apparatus according to the first embodiment.
FIG. 5 is a table showing an angle to be a threshold for deciding an opening/closing state from an angle α detected by a first detecting portion and an angle β detected by a second detecting portion in the first embodiment.
FIG. 6 is a table showing an antenna selected by a control portion based on the results of opening/closing detection of the first detecting portion and the second detecting portion in the first embodiment.

FIG. 4 is a diagram showing an electrical structure of an antenna device mounted on the portable wireless apparatus 100. The antenna device has a switching portion 117, a control portion 116, a wireless circuit (RF portion) 118, a first detecting portion 114, and a second detecting portion 115. The switching portion 117 is constituted by a high-frequency switch and switches a connection of the wireless circuit 118 and the first antenna 102 or the second antenna 104. The control portion 116 and the switching portion 117 constitute selecting means described in the claims. The first detecting portion 114 (corresponding to opening/closing detecting means described in the claims) serves to detect the opening/closing state of the upper housing 103 to be rotated around the first axis 106 of the two-axis hinge portion 101. The second detecting portion 115 (corresponding to rotation detecting means described in the claims) serves to detect the opening/closing state (rotation state) of the upper housing 103 to be rotated around the second axis 107 of the two-axis hinge portion 101.

FIG. 5 is a table showing an angle to be a threshold for deciding the opening/closing state from the angle α detected by the first detecting portion 114 and the angle β detected by the second detecting portion 115. More specifically, it is decided that the opening state is set if the angle α detected by the first detecting portion 114 is 10 to 160 degrees, and it is decided that the closing state is set at the other angles, that is, if the angle α is 0 to 10 degrees. On the other hand, it is decided that the opening state is set if the angle β detected by the second detecting portion 115 is 10 to 90 degrees, and it is decided that the closing state is set at the other angles, that is, if the angle β is 0 to 10 degrees.

The first detecting portion 114 and the second detecting portion 115 are connected to the control portion 116 respectively, and transmit, to the control portion 116, an electric signal indicative of a result of opening/closing detection. The control portion 116 selects the first antenna 102 or the second antenna 104 based on the respective results of the opening/closing detection, and transmits a control signal to the switching portion 117. The switching portion 117 connects the wireless circuit 118 and the first antenna 102 or the wireless circuit 118 and the second antenna 104 in accordance with the control signal.

Figure 7:
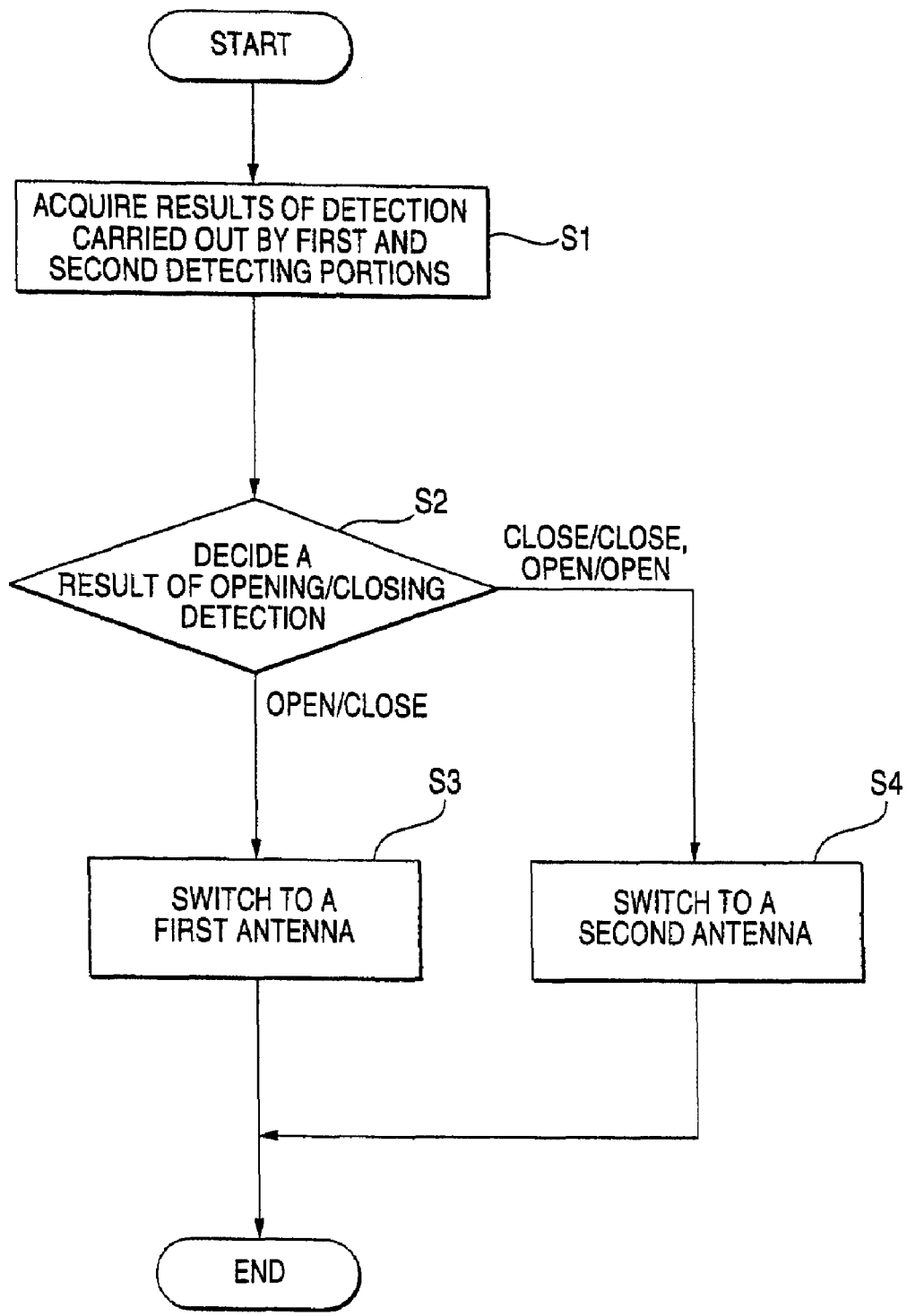
FIG. 7 is a flowchart showing an antenna switching control processing procedure according to the first embodiment of the invention.

Description will be given to the antenna switching operation of the portable wireless apparatus 100 having the structure. FIG. 6 is a table showing the antenna to be selected by the control portion 116 based on the results of the opening/closing detection of the first detecting portion 114 and the second detecting portion 115. The table is stored in an ROM provided in the control portion 116. FIG. 7 is a flowchart showing an antenna switching control processing procedure according to the first embodiment. A processing program is stored in the ROM provided in the control portion 116 and is executed every predetermined cycle by means of a CPU in the control portion 116 in the same manner. In place of the execution in each predetermined cycle, the processing program may be executed by an interruption processing when the results of the detection carried out by the first and second detecting portions are changed.

First of all, the results of the opening/closing detection of the first detecting portion 114 and the second detecting portion 115 are acquired (Step S1). The results of the opening/closing detection shown in FIG. 6 are decided (Step S2). The control portion 116 decides that the portable wireless apparatus 100 is set in a talking state when the upper housing 103 is opened with respect to the lower housing 105 around the first axis 106 as the result of the detection carried out by the first detecting portion 114 and the upper housing 103 is closed (a non-rotation state) with respect to the lower housing 105 around the second axis 107, that is, open/close is set as a result of the detection carried out by the second detecting portion 115, and transmits, to the switching portion 117, a signal for selecting the first antenna in order to select the first antenna 102 which is suitable for the talking state, thereby switching the antenna (Step S3). Then, the processing is ended.

On the other hand, the control portion 116 decides that the portable wireless apparatus 100 is set in a waiting state when the upper housing 103 is closed with respect to the lower housing 105 around the first axis 106 as the result of the detection carried out by the first detecting portion 114 and the upper housing 103 is closed (the non-rotation state) with respect to the lower housing 105 around the second axis 107, that is, close/close is set as the result of the detection carried out by the second detecting portion 115, and transmits, to the switching portion 117, a signal for selecting the second antenna in order to select the second antenna 104 which is suitable for the waiting state, thereby switching the antenna (Step S4). Then, the processing is ended.

On the other hand, the control portion 116 decides that the portable wireless apparatus 100 is set in a photographing state when the upper housing 103 is opened with respect to the lower housing 105 around the first axis 106 as the result of the detection carried out by the first detecting portion 114 and the upper housing 103 is opened (a rotation state) with respect to the lower housing 105 around the second axis 107, that is, open/open is set as the result of the detection carried out by the second detecting portion 115, and transmits, to the switching portion 117, a signal for selecting the second antenna in order to select the second antenna 104 which is suitable for the photographing state, thereby switching the antenna (Step S4). Then, the processing is ended.

In the portable wireless apparatus according to the embodiment, there is no case in which the upper housing 103 is set in the closing state with respect to the lower housing 105 around the first axis 106 and the upper housing 103 is set in the opening state with respect to the lower housing 105 around the second axis 107 (the rotation state), that is, the close/open state is set in respect of a structure.

In the portable wireless apparatus according to the first embodiment, thus, there are provided the first antenna 102 which is suitable for the talking state and the second antenna 104 which is suitable for the waiting state, and the first antenna 102 or the second antenna 104 is selected based on the result of the opening/closing detection which is decided from the angle α of the first axis 106 and the result of the opening/closing detection which is decided from the angle β of the second axis 107. Therefore, it is possible to select either of the antennas which is not influenced by the hands or fingers of a user. Consequently, it is possible to maintain high quality of a communication in various using configurations of the portable wireless apparatuses utilizing the CDMA method having the two-axis hinge mechanism.

While the first antenna 102 is the dipole antenna and the second antenna 104 is the monopole antenna in the first embodiment, the specification of the antenna is not particularly restricted. For example, even if at least one of the first antenna and the second antenna is set to be a built-in antenna such as a reverse F antenna or a patch antenna, the same advantages can be obtained.

While both of the two antennas 102 and 104 are the built-in antennas in the first embodiment, moreover, the built-in antennas are not restricted. For example, even if at least one of the first antenna and the second antenna is an external antenna such as a whip antenna or a helical antenna, the same advantages can be obtained. In this case, it is a matter of course that the external antenna has an elasticity or not.

While the description has been given to the case of the two antennas 102 and 104 in the first embodiment, furthermore, the number of the antennas may be three or more. While the two antennas 102 and 104 are disposed one by one in the upper and lower housings respectively in the first embodiment, moreover, a plurality of antennas may be provided only in the upper housing 103 or the lower housing 105.

Second Embodiment

Figure 8:
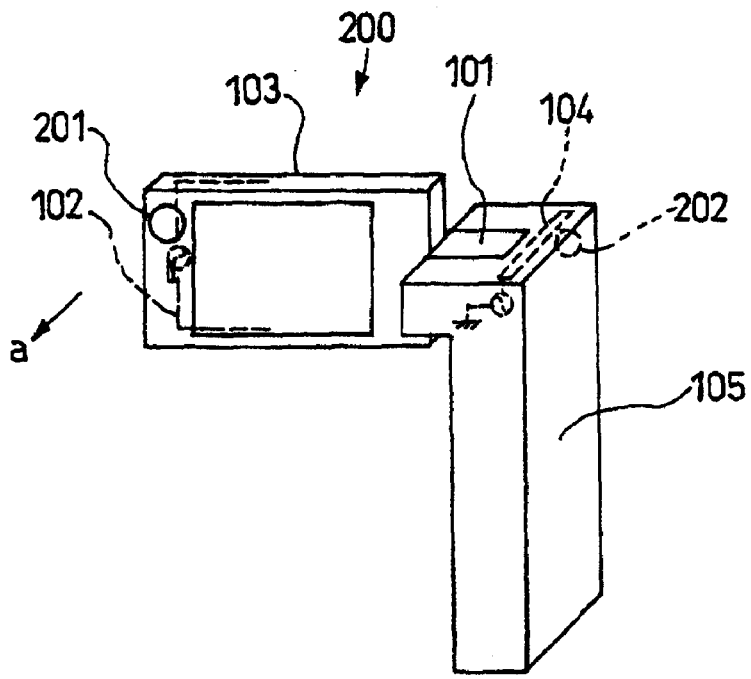
FIG. 8 is an explanatory view showing a structure of an appearance of a portable wireless apparatus according to a second embodiment of the invention.

FIG. 8 is a view showing an appearance of a potable wireless apparatus according to a second embodiment. Since the portable wireless apparatus according to the second embodiment has almost the same structure as that of the first embodiment, the same components as those in the first embodiment have the same reference numerals and description thereof will be therefore omitted. In a portable wireless apparatus 200, an image pick-up portion is provided in each of an upper housing 103 and a lower housing 105 connected to each other through a two-axis hinge portion 101.

More specifically, a first image pick-up portion 201 is disposed in the vicinity of a first antenna 102 provided in the upper housing 103 and a second image pick-up portion 202 is disposed in the vicinity of a second antenna 104 provided in the lower housing 105. The first image pick-up portion 201 serves to photograph a user by himself (herself), and a photographing direction thereof is shown in an arrow a of FIG. 8. On the other hand, the second image pick-up portion 202 serves to cause the user to photograph an object and a photographing direction thereof is the same as the photographing direction of the image pick-up portion 109 shown in FIG. 3 according to the first embodiment.

Figure 9:
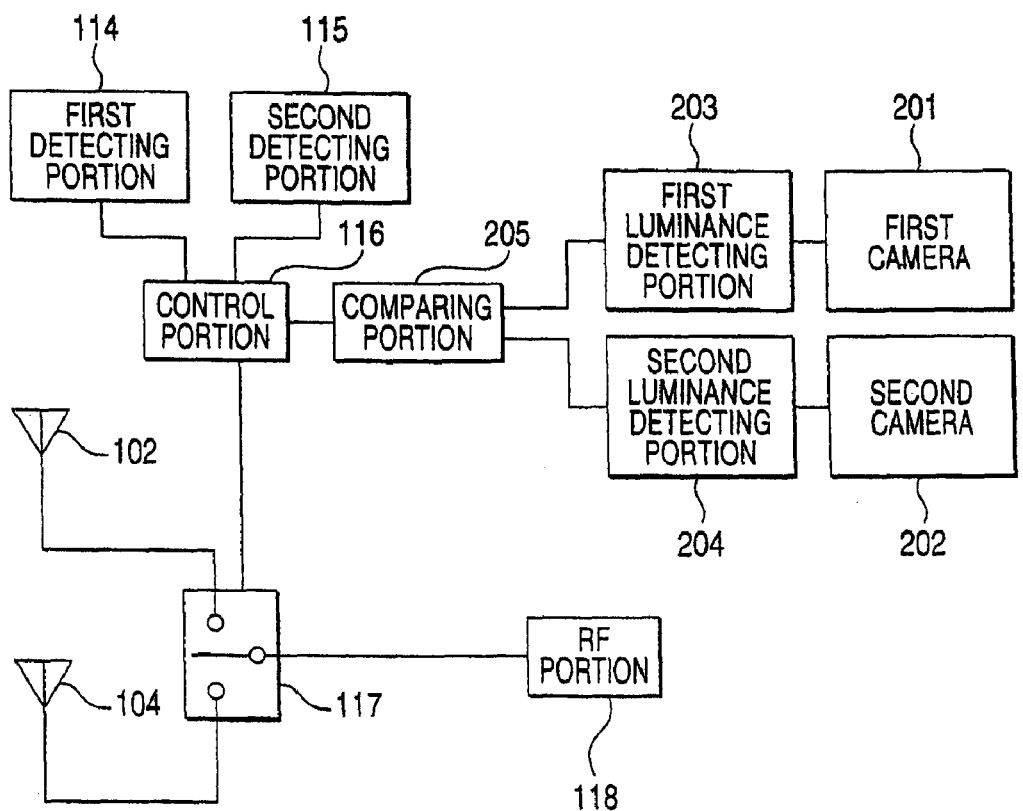
FIG. 9 is a block diagram showing an electrical connecting structure of an antenna device and a camera device which are mounted on the portable wireless apparatus according to the second embodiment.

FIG. 9 is a diagram showing an electrical structure of an antenna device and a camera device which are mounted on the portable wireless apparatus 200. The antenna device has the same structure as that in the first embodiment. On the other hand, the camera device has a comparing portion 205, a first luminance detecting portion 203 and a second luminance detecting portion 204 in addition to the first image pick-up portion (camera) 201 and the second image pick-up portion (camera) 202. The first luminance detecting portion 203 calculates a first mean luminance of a whole image photographed by the first image pick-up portion 201 and outputs the first mean luminance thus calculated to the comparing portion 205. The second luminance detecting portion 204 calculates a second mean luminance of a whole image photographed by the second image pick-up portion 202 and outputs the second mean luminance thus calculated to the comparing portion 205. The comparing portion 205 compares the first and second mean luminances which are input, and outputs a result of the comparison to a control portion 116.

Figure 10:
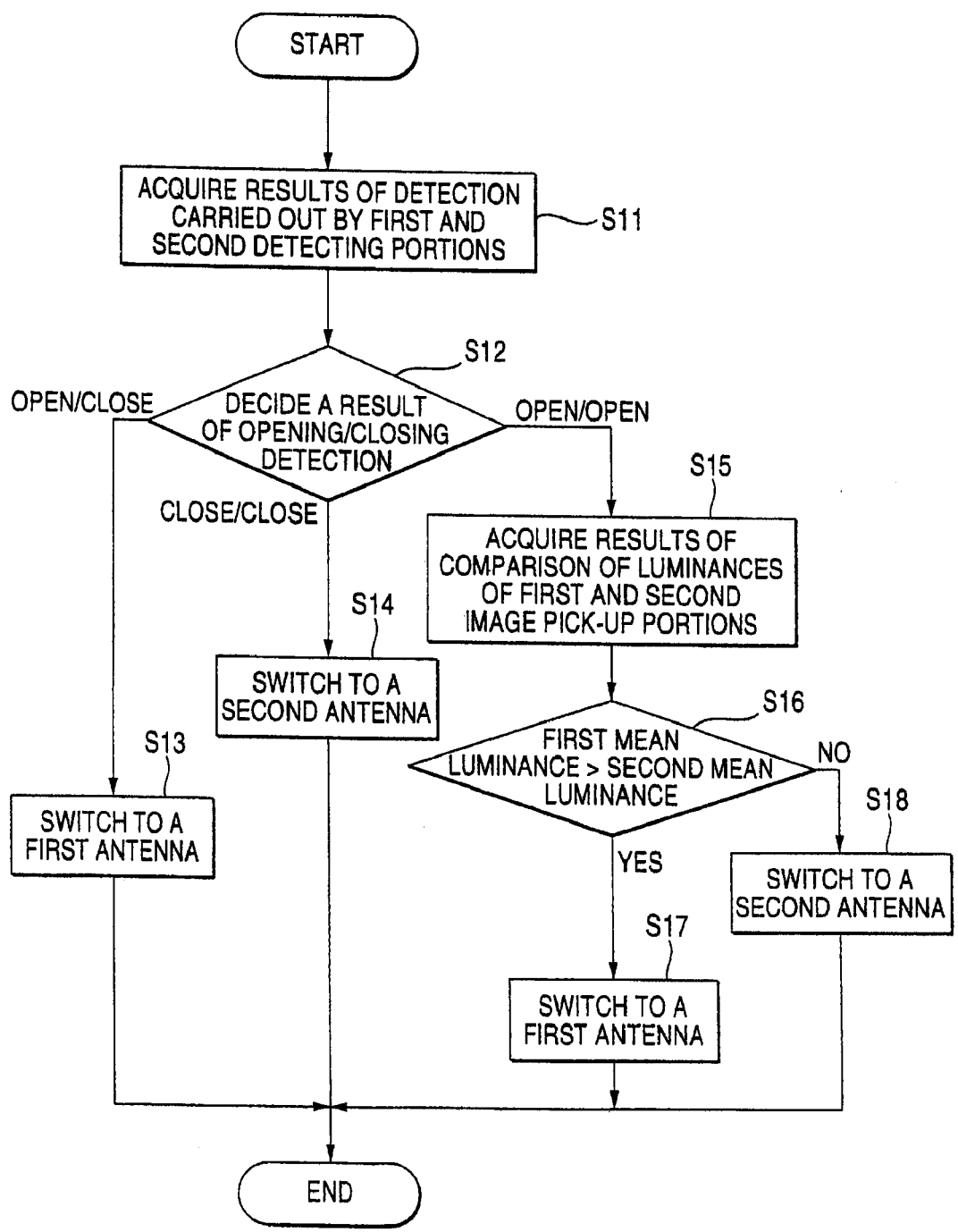
FIG. 10 is a flowchart showing an antenna switching control processing procedure according to the second embodiment of the invention.

Description will be given to the antenna switching control operation of the portable wireless apparatus 200 having the structure. FIG. 10 is a flowchart showing an antenna switching control processing procedure according to the second embodiment. A processing program is stored in an ROM provided in the control portion 116 and is executed every predetermined cycle by means of a CPU in the control portion 116 in the same manner. In place of the execution in each predetermined cycle, the processing program may be executed by an interruption processing when the results of the detection of the first and second detecting portions or the first and second luminance detecting portions are changed.

First of all, the results of the opening/closing detection of a first detecting portion 114 and a second detecting portion 115 are acquired (Step S11). With reference to the table of FIG. 6, the result of the opening/closing detection is decided (Step S12). In the same manner as in the first embodiment, the control portion 116 decides that the portable wireless apparatus 200 is set in a talking state when the upper housing 103 is opened with respect to the lower housing 105 around a first axis 106 as the result of the detection carried out by the first detecting portion 114 and the upper housing 103 is closed (a non-rotation state) with respect to the lower housing 105 around a second axis 107, that is, open/close is set as the result of the detection carried out by the second detecting portion 115, and transmits, to a switching portion 117, a signal for selecting the first antenna 102 in order to select the first antenna 102 (Step S13).

On the other hand, at the Step S12, the control portion 116 decides that the portable wireless apparatus 200 is set in a waiting state when the upper housing 103 is closed with respect to the lower housing 105 around the first axis 106 as the result of the detection carried out by the first detecting portion 114 and the upper housing 103 is closed (the non-rotation state) with respect to the lower housing 105 around the second axis 107, that is, close/close is set as the result of the detection carried out by the second detecting portion 115, and transmits, to the switching portion 117, a signal for selecting the second antenna 104 in order to select the second antenna 104 (Step S14).

On the other hand, at the Step S12, the control portion 116 decides that the portable wireless apparatus 200 is set in a photographing state when the upper housing 103 is opened with respect to the lower housing 105 around the first axis 106 as the result of the detection carried out by the first detecting portion 114 and the upper housing 103 is opened (a rotation state) with respect to the lower housing 105 around the first axis 106, that is, open/open is set as the result of the detection carried out by the second detecting portion 115, and furthermore, acquires the result of the comparison of the comparing portion 205 in this case (Step S15). As a result of the comparison, it is decided whether or not the first mean luminance obtained by the first image pick-up portion 201 is higher than the second mean luminance obtained by the second image pick-up portion 202 (Step S16). If the first mean luminance is higher than the second mean luminance, the first antenna 102 is selected (Step S17). On the other hand, if not so, the second antenna 104 is selected (Step S18). Then, the processing is ended.

According to the portable wireless apparatus in accordance with the second embodiment, thus, the first antenna 102 which is suitable is selected in the talking state and the second antenna 104 which is suitable is selected in the waiting state, and furthermore, the first antenna 102 or the second antenna 104 is selected based on the result of the detection carried out by the first and second detecting portions and the result of the comparison of the first mean luminance in the first image pick-up portion 201 with the second mean luminance in the second image pick-up portion 202 in the case in which the upper housing 103 is opened around the first axis 106 and the second axis 107 with respect to the lower housing 105 respectively (a rotation state). Therefore, the user can select either of the antennas which is not influenced by hands or fingers. In various using configurations of the portable wireless apparatus utilizing the CDMA method which comprises the two-axis hinge mechanism and the image pick-up portion, consequently, it is possible to maintain high quality of a communication.

While the description has been given to the case in which the invention is applied to the portable wireless apparatus using the CDMA method in the first and second embodiments, it is a matter of course that the invention may be applied to a portable wireless apparatus using a TDMA method.

Figure 11:
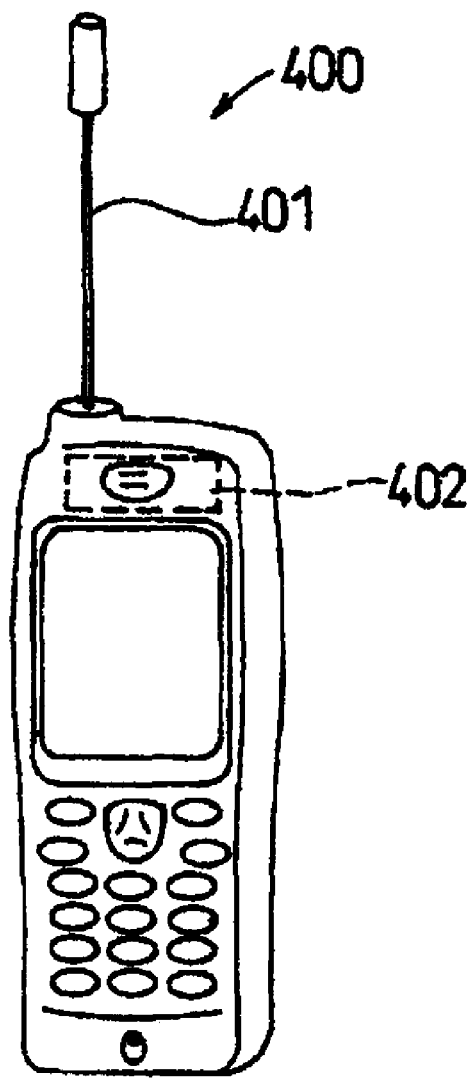
FIG. 11 is a perspective view showing an appearance of a conventional portable wireless apparatus mounting an antenna device thereon.
Figure 12:
FIG. 12 is a perspective view showing an appearance of a portable wireless apparatus using a CDMA method.
Figure 13:
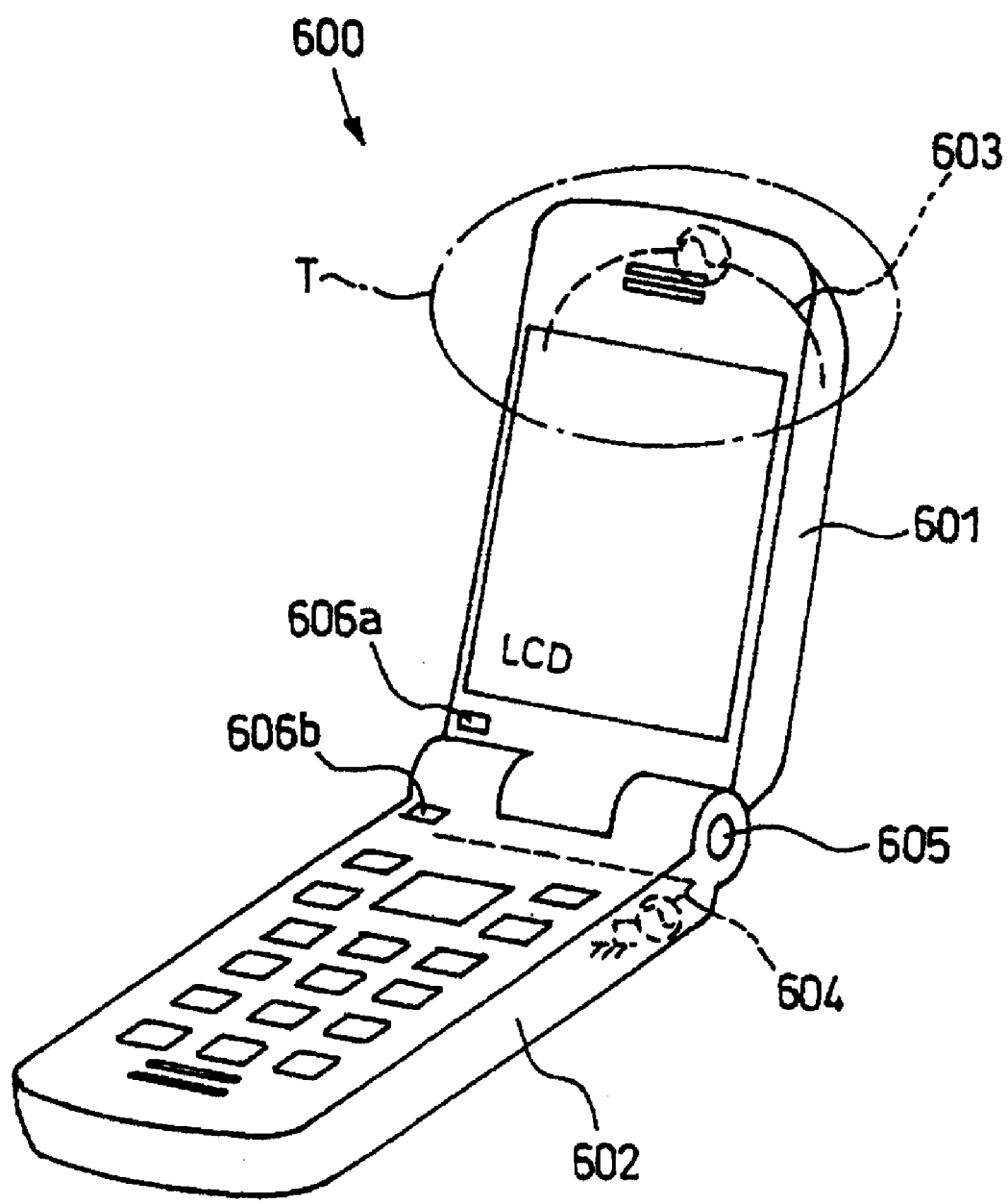
FIG. 13 is a perspective view showing an appearance of the portable wireless apparatus using the CDMA method having a built-in antenna.
Figure 14:
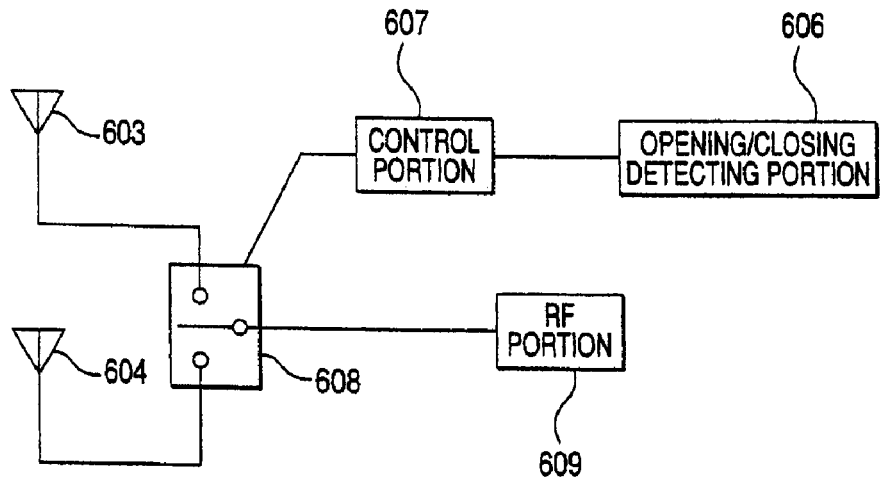
FIG. 14 is a block diagram showing a structure of an antenna device mounted on a folding type portable wireless apparatus in FIG. 13.
Figure 15:
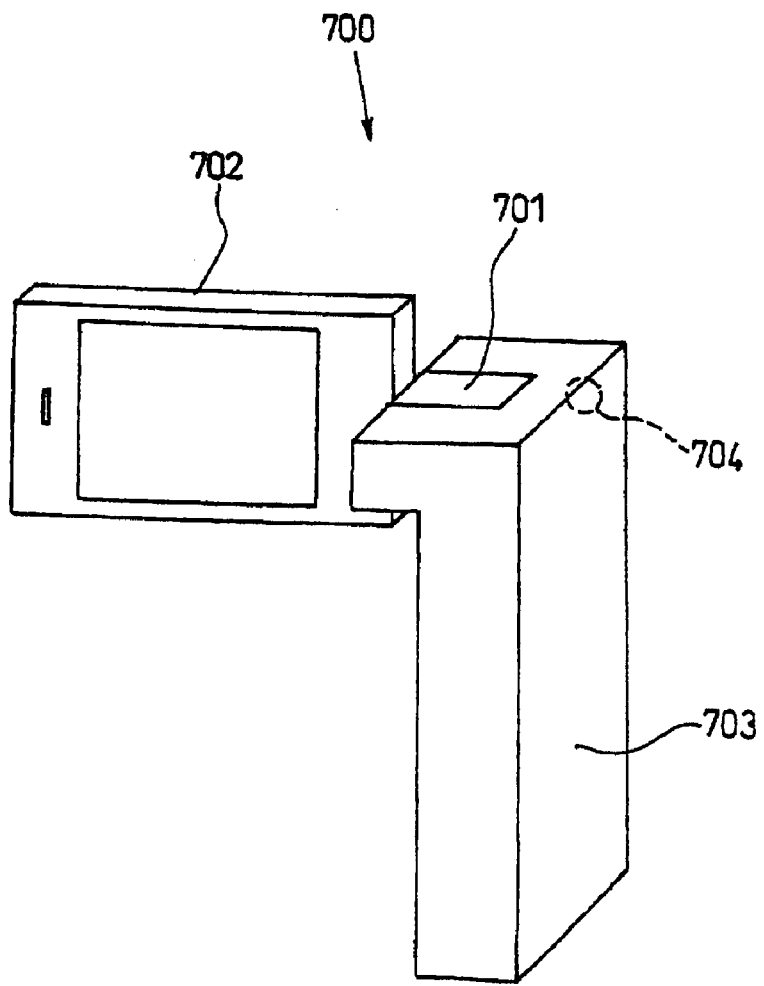
FIG. 15 is a perspective view showing an appearance of a portable wireless apparatus mounting a two-axis hinge mechanism thereon.

In the portable wireless apparatus having the two-axis hinge mechanism according to the second embodiment, moreover, the control for selecting the antenna is carried out by using both the results of the opening/closing detection carried out by the first and second opening/closing detecting portions and the results of the comparison of the first and second mean luminances obtained by the first and second luminance detecting portions. In the case in which the invention is applied to a portable wireless apparatus of a straight type (see FIGS. 11 and 12) or a portable wireless apparatus having a single-axis hinge mechanism (see FIG. 13), however, the control for selecting the antenna may be carried out by using only the results of the comparison of the first and second mean luminances obtained by the first and second luminance detecting portions.

While the first antenna 102 is the dipole antenna and the second antenna 104 is the monopole antenna in the second embodiment, moreover, the specification of the antenna is not particularly restricted. For example, even if at least one of the first antenna and the second antenna is set to be a built-in antenna such as a reverse F antenna or a patch antenna, the same advantages can be obtained.

While both of the two antennas 102 and 104 are the built-in antennas in the second embodiment, moreover, the built-in antennas are not restricted. For example, even if at least one of the first antenna and the second antenna is set to be an external antenna such as a whip antenna or a helical antenna, the same advantages can be obtained. In this case, it is a matter of course that the external antenna has an elasticity or not.

While the description has been given to the case of the two antennas 102 and 104 in the second embodiment, furthermore, the number of the antennas may be three or more. While the two antennas 102 and 104 are disposed one by one in the upper and lower housings respectively in the second embodiment, moreover, a plurality of antennas may be provided only in the upper housing 103 or the lower housing 105.

As described above, according to the embodiment, it is possible to maintain high quality of a communication in various using configurations obtained by the two-axis hinge mechanism. Moreover, it is possible to maintain the high quality of the communication in the case in which an image pick-up device is mounted.

While the invention has been described in detail with reference to the specific embodiments, it is apparent to the skilled in the art that various changes and modifications can be made without departing from the spirit and scope of the invention.

The application is based on Japanese Patent Application No. 2002-327102 filed on Nov. 11, 2002 and contents thereof are incorporated herein by reference.

INDUSTRIAL APPLICABILITY

As described above, according to the invention, it is possible to provide a portable wireless apparatus capable of maintaining high quality of a communication in various using configurations obtained by a two-axis hinge mechanism.

The invention claimed is:

1. A portable wireless apparatus having a hinge portion for opening/closing and rotatably supporting a first housing with respect to a second housing and serving to feed power between an antenna provided in the first housing or the second housing and a built-in wireless circuit, comprising:
an opening/closing detector for detecting an opening/closing state of the first housing, the first housing opening and closing about an opening/closing axis of the hinge portion;
a rotation detector for detecting a rotation state of the first housing, the first housing rotating about a rotating axis of the hinge portion perpendicular to the opening/closing axis of the hinge portion; and a selector selecting any of a plurality of antennas provided in at least one of the first housing and the second housing which is to be operated based on the opening/closing state and the rotation state, wherein the antennas comprise a first antenna and a second antenna, the first antenna provided on an end of the first housing opposite the hinge portion and the second antenna provided on an end of the second housing adjacent the hinge portion side.

2. The portable wireless apparatus according to claim 1, wherein the selector selects the first antenna when the opening state is detected and a non-rotation state is detected, selects the second antenna when the closing state is detected and the non-rotation state is detected, and selects the second antenna when the opening state is detected and a rotation state is detected.

3. The portable wireless apparatus according to claim 1, further comprising a plurality of image pick-ups and comparator for comparing luminances of images photographed by the image pick-ups respectively, the selector selecting any of the antennas which is to be operated based on the detected opening/closing state, the detected rotation state and a result of the comparison.

4. The portable wireless apparatus according to claim 3, wherein the image pick-ups are comprising a first image pick-up and a second image pick-up, and the first image pick-up is disposed in the vicinity of the first antenna and the second image pick-up is disposed in the vicinity of the second antenna.

5. The portable wireless apparatus according to claim 4, wherein the selector selects the first antenna when a luminance of the first image pick-up is higher than that of the second image pick-up, and selects the second antenna when the luminance of the first image pick-up is lower than that of the second image pickup.

6. The portable wireless apparatus according to claim 5, wherein in the case in which the opening state is detected and the rotation state is detected, the selector selects the first antenna when the luminance of the first image pick-up is higher than that of the second image pick-up, and selects the second antenna when the luminance of the first image pick-up is lower than that of the second image pick-up.

7. The portable wireless apparatus according to claim 1, wherein the second antenna extends parallel to the opening/closing axis.

* * * * *